(12) United States Patent
Hodges

(10) Patent No.: US 8,365,166 B2
(45) Date of Patent: Jan. 29, 2013

(54) SYSTEM AND METHOD FOR AUTOMATED PROVISIONING OF VMWARE IMAGE INSTANCES

(75) Inventor: Jeffrey Stephan Hodges, Sandy, UT (US)

(73) Assignee: Novell, Inc., Provo, UT (US)

(*) Notice: Subject to any disclaimer, the term of this patent is extended or adjusted under 35 U.S.C. 154(b) by 1338 days.

(21) Appl. No.: 11/708,217

(22) Filed: Feb. 20, 2007

(65) Prior Publication Data

US 2008/0201709 A1    Aug. 21, 2008

(51) Int. Cl.
*G06F 9/455* (2006.01)
*G06F 15/16* (2006.01)
*G06F 15/177* (2006.01)

(52) U.S. Cl. .............................. 718/1; 709/203; 709/222

(58) Field of Classification Search .......... 718/1; 708/1; 709/203, 222
See application file for complete search history.

(56) References Cited

U.S. PATENT DOCUMENTS

| | | | |
|---|---|---|---|
| 7,356,679 B1 * | 4/2008 | Le et al. ............................ | 713/1 |
| 7,577,722 B1 * | 8/2009 | Khandekar et al. ........... | 709/220 |
| 7,802,000 B1 * | 9/2010 | Huang et al. .................. | 709/228 |
| 7,970,909 B1 * | 6/2011 | Cox et al. ....................... | 709/227 |
| 8,102,985 B2 * | 1/2012 | Shaffer et al. ............ | 379/209.01 |
| 2003/0140131 A1 * | 7/2003 | Chandrashekhar et al. | .. 709/223 |
| 2007/0186212 A1 * | 8/2007 | Mazzaferri et al. ............... | 718/1 |
| 2007/0260702 A1 * | 11/2007 | Richardson et al. .......... | 709/217 |
| 2008/0163210 A1 * | 7/2008 | Bowman et al. ................. | 718/1 |

OTHER PUBLICATIONS

Krsul et al, VMPlants: Providing and Managing Virtual Machine Execution Environments for Grid Computing, Nov. 2004, Supercomputing, 2004. Proceedings of the ACM/IEEE SC2004 Conference, p. 7-7.*

* cited by examiner

*Primary Examiner* — Meng An
*Assistant Examiner* — Blake Kumabe
(74) *Attorney, Agent, or Firm* — Haynes and Boone, LLP

(57) ABSTRACT

A system and method for provisioning virtual machines for a demonstration are described. In one embodiment, the system comprises a scheduling server for enabling a user to schedule a demonstration by selecting a demonstration set and related details using a scheduling web page and a plurality of provisioning servers each connected to the scheduling server via an Internet connection, each of the provisioning servers having stored thereon a plurality of demonstration sets each comprising at least one VM. Responsive to selection of a demonstration set by the user, the scheduling server selects one of the provisioning servers to host the scheduled demonstration and notifies the selected provisioning server of details regarding the scheduled demonstration. The selected provisioning server executes a provisioning process for modifying a configuration file of each at least one VM such that a network number therein is set to a unique number associated with the user and the scheduled demonstration, and modifying a VM snapshot file associated with each at least one VM such that a network number therein is set to the unique number associated with the user and the scheduled demonstration.

20 Claims, 4 Drawing Sheets

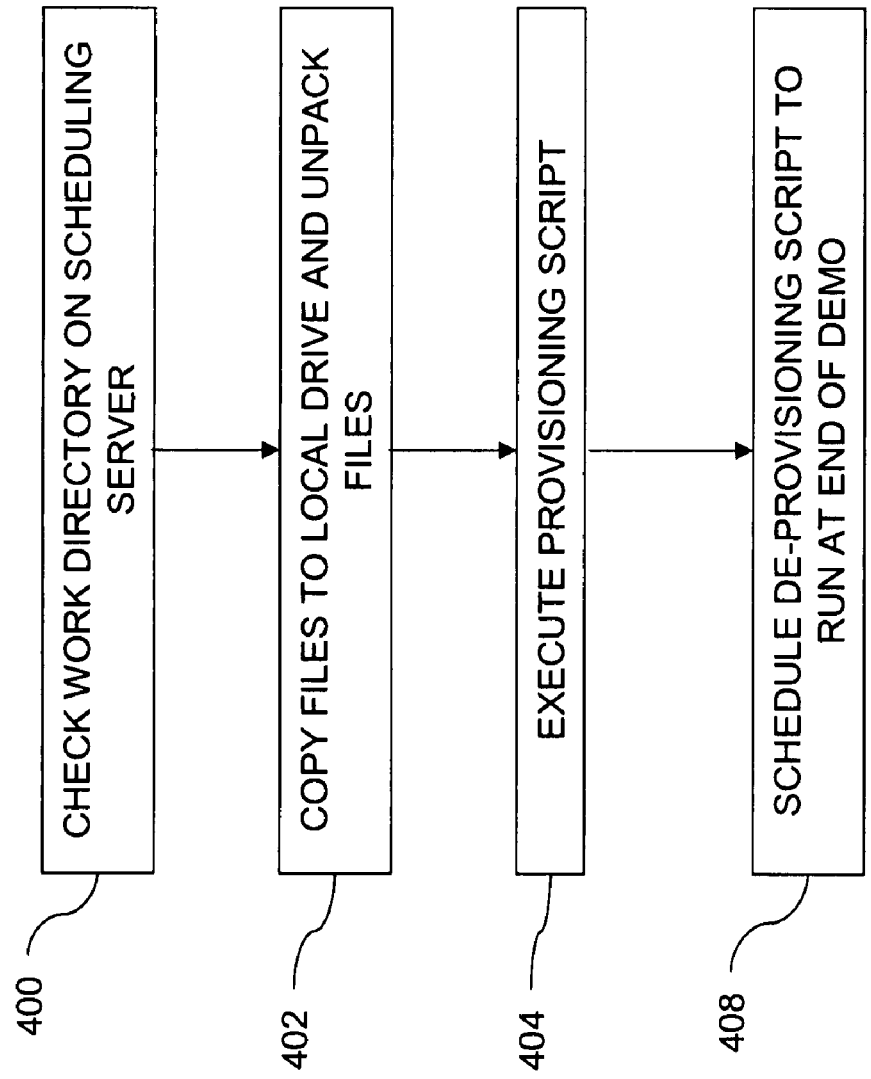

SYSTEM AND METHOD FOR AUTOMATED PROVISIONING OF VMWARE IMAGE INSTANCES

BACKGROUND

VMware is virtualization software that enables a user to set up multiple virtual machines ("VMs") on a single computer and to use one or more of the VMs simultaneously within a host operating system. Each VM can execute its own guest operating system. As a result, VMware enables a single physical computer to run two or more operating systems simultaneously.

In VMware terminology, a "clone" is a copy of an existing VM. The existing VM is referred to as the "parent" of the clone. When the cloning operation is complete, the clone is a separate VM, though it may share virtual disks with the parent VM. As a direct result, changes made to a clone do not affect its parent; similarly, changes made to the parent do not appear in the clone. Additionally, a clone's MAC address and unique identifier ("UID") are different from those of its parent. A "full clone" is an independent copy of a VM that shares nothing with the parent VM after the cloning is complete. Ongoing operation of a full clone is entirely separate from the parent VM. A "linked clone" is a copy of a VM that shares virtual disks with the parent VM in an ongoing manner. This conserves disk space and allows multiple VMs to use the same software installation.

A linked clone is made from a snapshot of the parent; all files available on the parent at the moment of the snapshot continue to remain available to the linked clone. Ongoing changes to the virtual disk of the parent do not affect the linked clone and changes to the disk of the linked clone do not affect the parent.

When VMware is used in an environment that uses Media Access Control ("MAC") and/or Internet Protocol ("IP") addresses as unique identifiers ("UIDs"), the MAC address needs to be manually configured for each VM to insure uniqueness by editing the configuration, or .vmx, file thereof to change the MAC address of the corresponding VM. This process is cumbersome, time-consuming, and undesirable.

SUMMARY

In one embodiment, a system is provided for provisioning a demonstration comprising at least one virtual machine ("VM") instance. The system comprises a scheduling server for enabling a user to schedule a demonstration by selecting a demonstration set and related details using a scheduling web page and a plurality of provisioning servers each connected to the scheduling server via an Internet connection, each of the provisioning servers having stored thereon a plurality of demonstration sets each comprising at least one VM. Responsive to selection of a demonstration set by the user, the scheduling server selects one of the provisioning servers to host the scheduled demonstration and notifies the selected provisioning server of details regarding the scheduled demonstration. The selected provisioning server executes a provisioning process for modifying a configuration file of each at least one VM such that a network number therein is set to a unique number associated with the user and the scheduled demonstration, and modifying a VM snapshot file associated with each at least one VM such that a network number therein is set to the unique number associated with the user and the scheduled demonstration.

In another embodiment, a method is provided for provisioning a demonstration comprising at least one virtual machine ("VM") instance. The method comprises, responsive to a user's scheduling a demonstration via a web page presented by a scheduling server, wherein the scheduling a demonstration comprises the user selecting one of a plurality of available demonstration sets and specifying a time and duration of the demonstration, the scheduling server selecting a provisioning server to host the demonstration; notifying the selected provisioning server of the scheduled demonstration; the selected provisioning server modifying a configuration file of each VM comprising the selected demonstration set to provide the user with a private network; providing the user with at least one password and information for enabling the user to access the demonstration; and notifying the user, when the demonstration is ready to be accessed.

In another embodiment, a system is provided for provisioning a demonstration comprising at least one virtual machine ("VM") instance. The system comprises means for enabling a user to schedule a demonstration via a web page by selecting one of a plurality of available demonstration sets and specifying a time and duration of the demonstration; means for selecting a provisioning server to host the demonstration; means for notifying the selected provisioning server of details regarding the scheduled demonstration; means for causing the selected provisioning server to modify a configuration file of each VM comprising the selected demonstration set, thereby to provide the user with a private network; means for notifying the user of passwords and connection information; and means for notifying the user when the demonstration is ready to be accessed.

BRIEF DESCRIPTION OF THE DRAWINGS

FIG. 4 is a flowchart illustrating operation of a provisioning server for implementing a method for automated provisioning of VMware image instances in accordance with one embodiment.

DETAILED DESCRIPTION

One embodiment includes a system and a method for automated provisioning of VMware image instances. To better illustrate the advantages and features of the invention, a particular description of several embodiments will be provided with reference to the attached drawings. These drawings, and other embodiments described herein, only illustrate selected aspects of the invention and do not limit the invention's scope. Further, despite reference to specific features illustrated in the example embodiments, it will nevertheless be understood that these features are not essential to all embodiments and no limitation of the scope of the invention is thereby intended. Any alterations and further modifications in the described embodiments, and any further applications of the principles of the invention as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
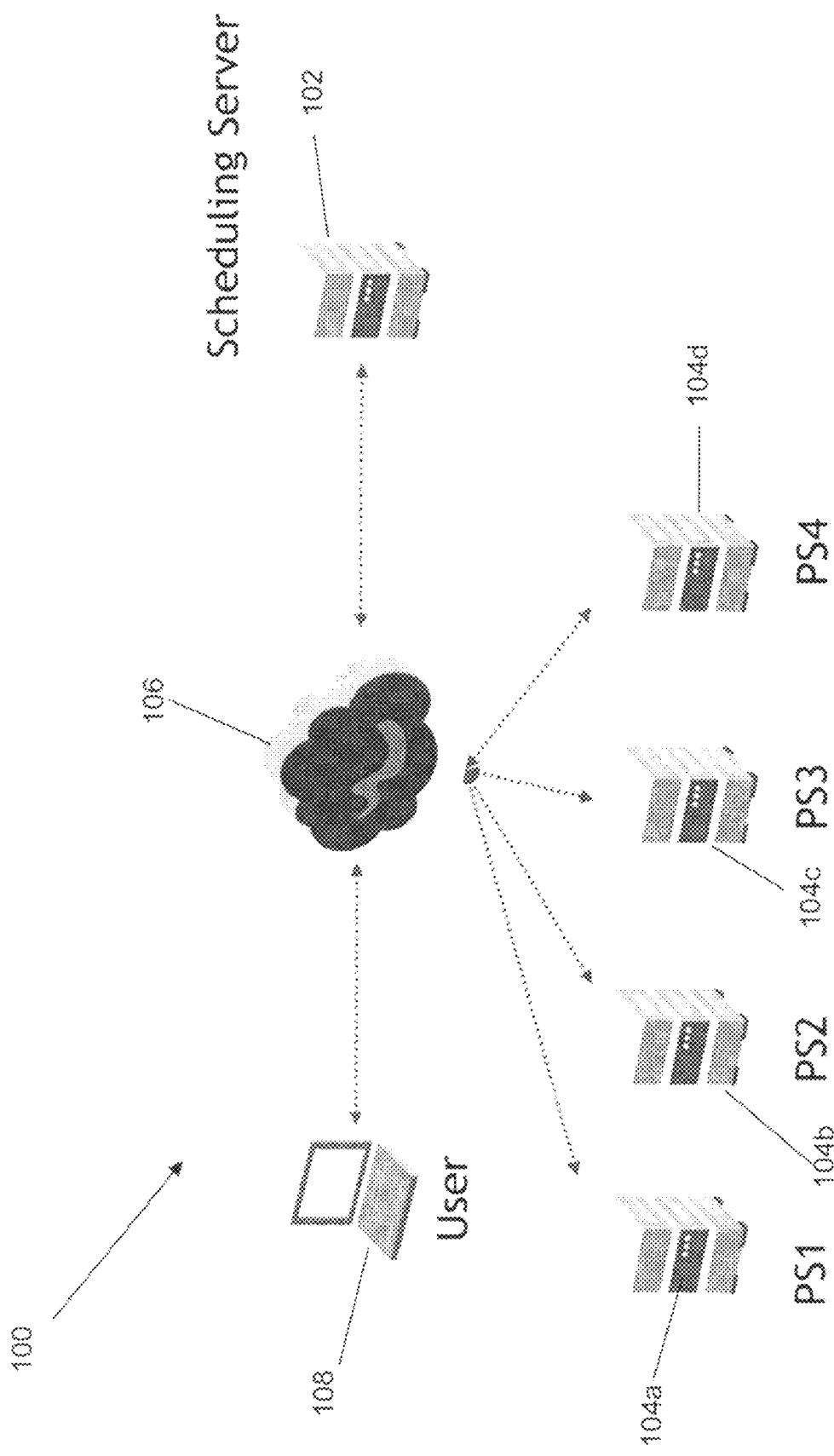
FIG. 1 is a block diagram of a system for automated provisioning of VMware image instances in accordance with one embodiment.

FIG. 1 is a block diagram of a system 100 for implementing automated provisioning of VMware image instances in accordance with one embodiment. As shown in FIG. 1, the system 100 includes a scheduling server 102 connected to one or more provisioning servers, illustrated in FIG. 1 by provisioning servers 104a-104d, via a network 106. In one embodiment, the network 106 comprises the Internet and the provisioning servers 104a-104d comprise a server farm situated at a location that is geographically remote from the scheduling server 102. One or more users, represented in FIG. 1 by a user 108, may contact the scheduling server 102 to schedule a demonstration ("demo"), as will be described in detail hereinbelow. In accordance with features of one embodiment, the user 108 can host remote demos at a customer site or remotely. Demos can be driven from any Internet location and viewed using various clients, such as NX, VNC, or an Internet browser. Although only a single server farm comprising the provisioning servers 104a-104d is shown in FIG. 1, it is anticipated that there may be several such server farms, each situated in a location that is geographically remote from the scheduling server 102 and from the other server farms.

Figure 2:
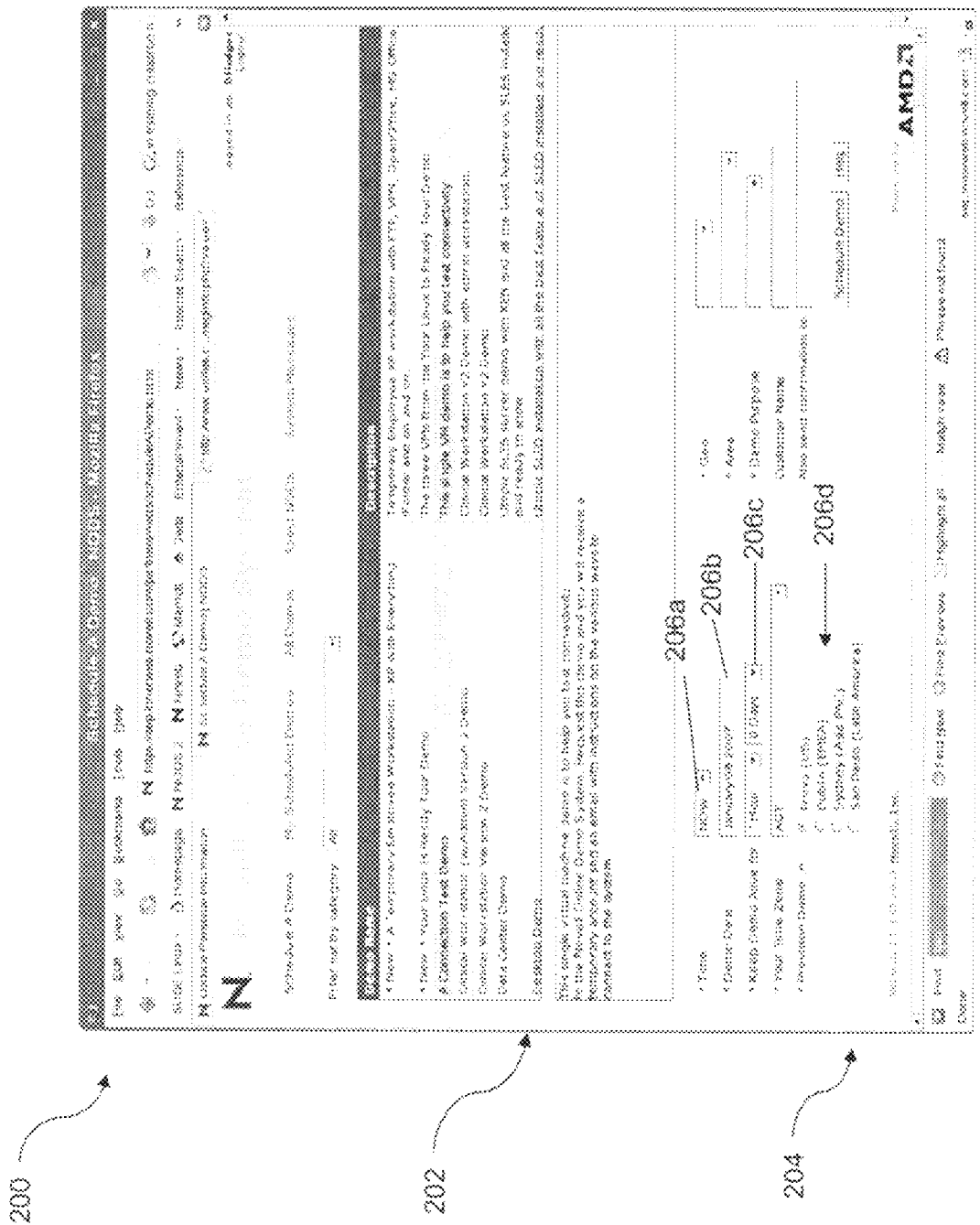
FIG. 2 illustrates a demo scheduling page in accordance with one embodiment.

Referring now to FIG. 2, the scheduling server 102 (FIG. 1) provides a web front end comprising a demo scheduling page 200 that enables the user 108 to browse, select, schedule, and manage demos. As shown in FIG. 2, a first section 202 provides the user with a list of available demos by name, along with a description thereof. A second section 204 provides the user with options concerning certain details about the selected demo, including a time 206a, date 206b, duration 206c, and a location of the provisioning server (or server farm) 206d. In the embodiment illustrated in FIG. 2, server farms are located in four locations, including Provo, Dublin, Sydney, and Sao Paulo.

Once the user 108 has completed and submitted the demo scheduling page 200, the scheduling server 102 selects one of the provisioning servers at the selected location to host the demo and then creates a text file indicating the date, time, duration, and vmnet name of the demo, as well as the email address of the user and the identity of the selected provisioning server. Each of the provisioning servers, including the provisioning servers 104a-104d, has a work directory associated therewith on the scheduling server 102. The text file is stored in the work directory associated with the selected provisioning server.

A scheduling script running periodically (e.g., three times per minute) opens the text file, produces VNC and NX session passwords, and emails the user with the selected provisioning server and credentials therefor. The scheduling script also produces a basis for a script that the selected provisioning server will run and places the resulting files in the work directory associated with the selected provisioning server.

The provisioning servers 104a-104d actually host the VMware sessions comprising the demos that the user 108 ultimately connects with. As will be described in greater detail below with reference to FIG. 4, a script running on each of the provisioning servers in the system 100, including the provisioning servers 104a-104d, periodically checks the provisioning server's work directory on the scheduling server 102. If there are files in the work directory, the provisioning server copies the files to its local drive and unpacks them. A provisioning script running on the provisioning server emails the user, such as the user 108, with the provided password and then modifies the VMX file for each of the VMs comprising the demo so each user has a private network. Each provisioning server can host up to six simultaneous users running identical or different demos, or "demo sets". As will be described in detail below, a number is assigned to each user (e.g., user1, user2, . . . user6) to distinguish the users from one another. Once the demo has been provisioned, a second email is sent by the provisioning server to the user to inform the user that the demo is ready.

Each provisioning server has a shared base of all of the available VMs comprising all of the available demo sets, as well as a master copy of a smaller set of files that each demo uses along with the shared base. At the time of provisioning, a clean copy of the smaller file set is made for each VM in the demo set and rights to the smaller file set copies are granted to the user.

In one embodiment, the provisioning script writes another script file (a "de-provisioning script") that will undo all of the setup and end the user's rights to the system, thereby ending the demo. In particular, a timer is set at the time of provisioning to run the de-provisioning script at the time provided in the original work file obtained from the scheduling server. At the appointed time, the de-provisioning script changes the user's password, removes the user's rights to all files related to the demo, disconnects any existing sessions for the user, and deletes the provisioning files that created the demo.

In one embodiment, the web front end referred to in FIG. 2 can be used to request an extension of time for the demo. The same script run by the provisioning server to check for work on the scheduling server will also look for extension requests on the scheduling server. Additionally, the web front end can be used to cancel the user can cancel a demo before the demo is scheduled to end. Once again, the same script run by the provisioning server to check for work on the scheduling server will also look for cancellation requests on the scheduling server.

As previously noted, each VM of a demo set comprises two file sets, including a base file set, which includes the original VM installation and setup, and a snapshot file set, which is created when the user starts the VM. The running VM reads from both the base file set and the snapshot file set, whichever is more current. In VMware terms, the running VM is called a "linked clone". Many linked clones can share the same base file set, as the base file set is only read from; never written to.

As also previously noted, linked clones have the same IP address and MAC address as one another. When the VMs are running on the same network, communication will fail when the VMs "see" each other and the same IP and MAC address are detected on the same network. Each VM takes its network, or vmnet, number from the VMX file. The VMX file controls most aspects of the configuration of a VM. At provisioning, a copy of the snapshot file set is made in the private disk space allotted to the demo on the server before the VMX file is modified. In one embodiment, the provisioning process on the provisioning server opens the VMX file and changes the network number to vmnet#, where # indicates which user the vmnet corresponds to. For example, the first user ("user1") is assigned "vmnet1"; the second user ("user2") is assigned "vmnet2"; and so on up to "user6" and "vmnet6". Additionally, a user name "demo#" is assigned to each user on the same basis, so that user1 is assigned "demo1", user2 is assigned "demo2", and so on. As a result, many VMs with the same IP and MAC addresses can run at the same time on the same server without conflict. It will be noted that the VM author is not required to change the IP address inside the VM or make multiple copies to accommodate the VMs running with the same IP and MAC addresses.

It will be recognized that VMs can be "reverted" to an earlier state by discarding the snapshot file set and starting a new snapshot file set. This allows a user to run a demo, and then go back in time to the starting point quickly and easily. The process of "reverting" reads the VMSN (VMware snapshot configuration) file to find the original vmnet number. In one embodiment, the vmnet number in the VMSN file is also set to the new vmnet number (e.g., vmnet1, vmnet2, etc.), so that the correct network number will be maintained during the reversion process.

In one embodiment, a favorites file that the VMware reads at startup is created and contains the provisioned VMs, such that the VMs show up in the user's menu without the user's having to add them manually.

As previously indicated, the provisioning script gives the user rights to the assigned demo (e.g., demo1). The provisioning server sends an email to the user informing the user that the demo is ready and what user name and passwords are valid.

Figure 3:
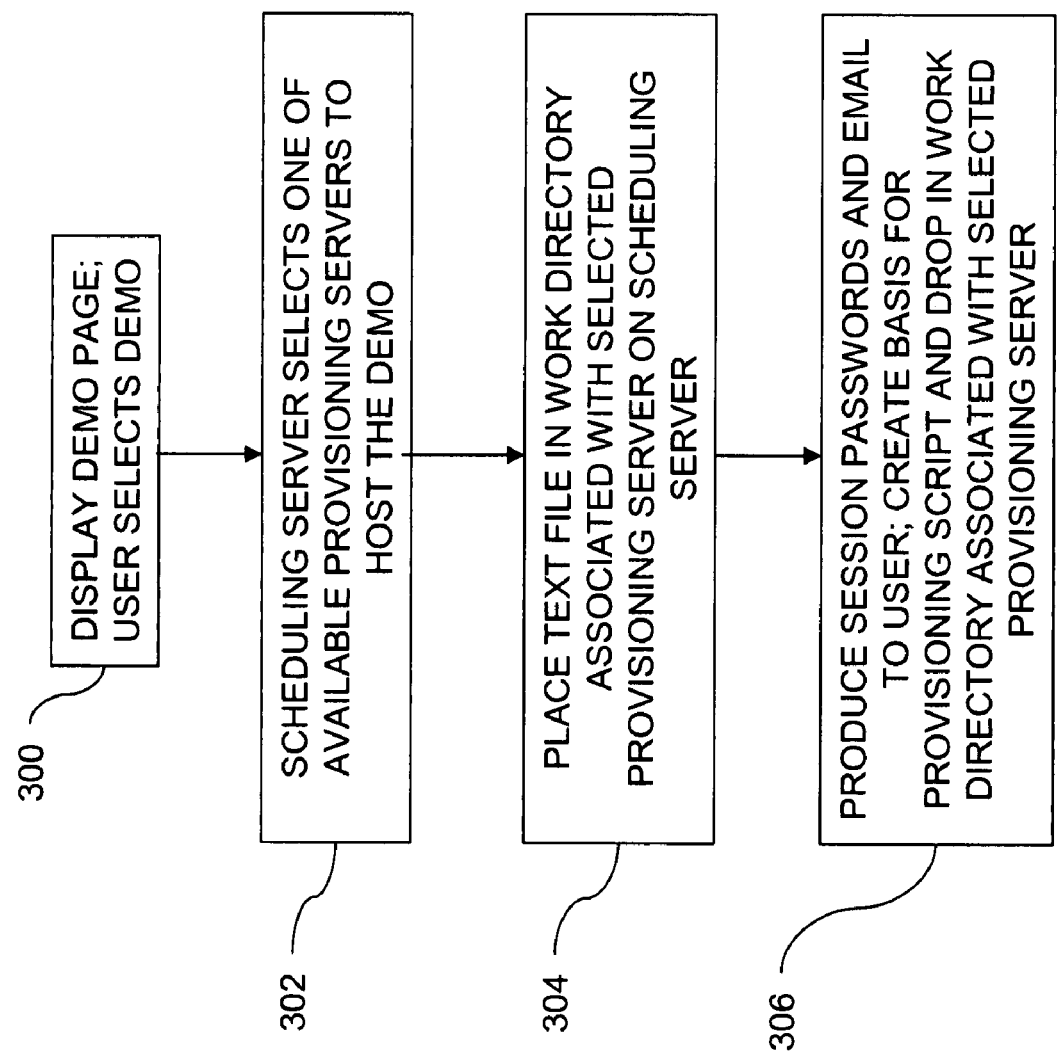
FIG. 3 is a flowchart illustrating operation of a scheduling server for implementing a method for automated provisioning of VMware image instances in accordance with one embodiment.

FIG. 3 is a flowchart illustrating operation of the scheduling server, such as the scheduling server 102, for implementing a method for automated provisioning of VMware image instances in accordance with one embodiment. In step 300, the scheduling server displays a demo scheduling page, such as the page 200, to the user. Once the user has completed and submitted the page, execution proceeds to step 302, in which the scheduling server uses the information to select one of the provisioning servers to host the demo. Typically, this determination is based on the location of the server, as compared to the location requested by the user on the demo selection page, and the relative utilization of the provisioning servers in the requested location. In step 304, the scheduling server places a text file in the work directory associated with the selected provisioning server. The text file includes the user number (e.g., user1, user2, etc.), network card, demo set name, date, time, and duration of the demo, and other information that the selected provisioning server needs to set up the demo.

In step 306, a scheduling script running periodically (e.g., three times per minute) on the scheduling server opens the text file, produces VNC and NX session passwords, and emails the user with the identity of the selected provisioning server and credentials therefor. The scheduling script also generates the basis for the provisioning script run by the selected provisioning server. The scheduling script drops the resulting files in the work directory of the selected provisioning server.

FIG. 4 is a flowchart illustrating operation of a provisioning server for implementing a method for automated provisioning of VMware image instances in accordance with one embodiment. It will be recognized that the steps illustrated in FIG. 4 are performed by each of the provisioning servers in the system 100. In step 400, the provisioning server runs a script to check its work directory on the scheduling server. In step 402, the provisioning server copies any files found in its work directory to its local drive and unpacks them. In step 404, the provisioning script is executed. Execution of the provisioning script results in the user being provided with the necessary passwords for running the demo. In addition, the provisioning script modifies the VMX files of all of the VMs necessary for running the demo to provide a private network for the user. For example, as described f in detail above, the first user ("user1") is given a user name of "demo1" and the VMX files for each of the VMs of the demo set is modified to set the vmnet type thereof to "NAT" and the vmnet number thereof to "vmnet1". This change is also made in the binary VMSN file for each VM in the demo set. Additionally, two VNC sessions are set and their passwords are set to demo1. Moreover, the master snapshot file set is copied to a private area on the provisioning server, e.g., demoroot2/userdirs/demo1/vmwhatever.

In step 408, the provisioning server sets a timer to run the de-provisioning script at the time indicated in the work order obtained from the work directory on the scheduling server. As previously indicated, the de-provisioning script removes demo1's rights to the VM subdirectory and changes demo1's password to a very long random. The de-provisioning script also removes demo1's VNC password file and kills all running sessions.

As also previously noted, the script that checks the work directory (step 402) also determines whether the demo has been terminated early or an extension has been requested. This script runs throughout the process illustrated in FIG. 4 and initiates the actions necessary to act on the termination or extension.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A system for provisioning a demonstration comprising at least one virtual machine ("VM") instance, the system comprising:
   a scheduling server for enabling a user to schedule a demonstration by selecting a demonstration set and a time and duration of the demonstration using a scheduling web page; and
   a plurality of provisioning servers each connected to the scheduling server via an Internet connection, each of the provisioning servers having stored thereon a plurality of demonstration sets each comprising at least one VM;
   wherein responsive to selection of a demonstration set by the user, the scheduling server selects one of the provisioning servers to host the scheduled demonstration and notifies the selected provisioning server of the time and duration of the scheduled demonstration; and
   wherein the selected provisioning server executes a provisioning process for:
      modifying a configuration file of each at least one VM to set a network number therein to a unique number associated with the user and the scheduled demonstration; and
      modifying a VM snapshot file associated with each at least one VM to set a network number therein to the unique number associated with the user and the scheduled demonstration;
   wherein subsequent to the scheduling a demonstration using the scheduling web page, the user is provided with at least one password and information for enabling the user to access and view the demonstration; and
   wherein subsequent to providing the user with at least one password and information, notifying the user when the demonstration is ready to be accessed with the at least one password and information.

2. The system of claim 1 wherein each of the provisioning servers can host a demonstration for each of multiple users simultaneously up to a predetermined maximum number of users.

3. The system of claim 1 wherein the provisioning servers are divided into a plurality of server farms.

4. The system of claim 3 wherein each of the server farms is situated in a location that is geographically remote from the other server farms.

5. The system of claim 3 wherein at least one of the server farms is situated in a location that is geographically remote from the scheduling server.

6. The system of claim 1 wherein the selected provisioning server terminates the scheduled demonstration at a predetermined time, wherein the predetermined time is specified by the user during scheduling of the demonstration.

7. The system of claim 1 wherein a provisioning server location is specified by the user during scheduling of the demonstration.

8. The system of claim 7 wherein the scheduling server selects one of the provisioning servers to host the scheduled demonstration based at least in part on a location and availability of the provisioning server.

9. The system of claim 1 wherein the provisioning process comprises a script.

10. A method for provisioning a demonstration comprising at least one virtual machine ("VM") instance, the method comprising:
responsive to a user's scheduling a demonstration via a web page presented by a scheduling server, wherein the scheduling a demonstration comprises the user selecting one of a plurality of available demonstration sets and specifying a time and duration of the demonstration, the scheduling server selecting a provisioning server to host the demonstration;
notifying the selected provisioning server of the scheduled demonstration;
the selected provisioning server modifying a configuration file of each VM comprising the selected demonstration set to provide the user with a private network;
the selected provisioning server modifying a VM snapshot file associated with each at least one VM to set a network number therein to the unique number associated with the user and the scheduled demonstration;
subsequent to the scheduling a demonstration using the web page presented by the scheduling server, providing the user with at least one password and information for enabling the user to access and view the demonstration; and
subsequent to providing the user with at least one password and information, notifying the user when the demonstration is ready to be accessed.

11. The method of claim 10 further comprising terminating the demonstration at a time scheduled by the user.

12. The method of claim 11 further comprising:
receiving a request from the user to terminate the demonstration at a time different than the time scheduled by the user; and
terminating the demonstration at the requested time.

13. The method of claim 10 wherein the notifying comprises placing a work order file in a directory associated with the selected provisioning server, wherein the directory is located on the scheduling server and wherein the selected provisioning server checks the associated directory periodically to determine whether a work order has been placed therein.

14. The method of claim 10 wherein the modifying configuration files of each VM comprising the selected demonstration set to provide the user with a private network comprises modifying a configuration file of each VM to set a network number therein to a unique number associated with the user and the scheduled demonstration.

15. The method of claim 14 wherein the selected provisioning server comprises a set of shared base files for the VMs and a master copy of a snapshot file for each VM.

16. A system for provisioning a demonstration comprising at least one virtual machine ("VM") instance, the system comprising:
means for enabling a user to schedule a demonstration via a web page by selecting one of a plurality of available demonstration sets and specifying a time and duration of the demonstration;
means for selecting a provisioning server to host the demonstration;
means for notifying the selected provisioning server of the specified time and duration of and additional details regarding the scheduled demonstration;
means for causing the selected provisioning server to modify a configuration file of each VM comprising the selected demonstration set, thereby to provide the user with a private network;
means for causing the selected provisioning server to modify a VM snapshot file associated with each at least one VM to set a network number therein to the unique number associated with the user and the scheduled demonstration;
means for notifying the user of passwords and connection information subsequent to the user's scheduling the demonstration via the web page; and
means for notifying the user when the demonstration is ready to be accessed and viewed with the passwords and connection information.

17. The system of claim 16 further comprising means for terminating the demonstration at a time scheduled by the user.

18. The system of claim 16 further comprising means responsive to a request from the user for terminating the demonstration at a time different than the time originally scheduled by the user.

19. The system of claim 16 wherein the means for modifying a configuration file of each VM comprising the selected demonstration set to provide the user with a private network comprises means for modifying a configuration file of each VM to set a network number therein to a unique number associated with the user and the scheduled demonstration.

20. The system of claim 19 further comprising a set of shared base files for the VMs and a master copy of a snapshot file for each VM.

* * * * *